(12) United States Patent
Lewis

(10) Patent No.: US 8,584,314 B2
(45) Date of Patent: Nov. 19, 2013

(54) FLEA VACUUM INCLUDING A KILL AGENT

(75) Inventor: Donald Lewis, Encinitas, CA (US)

(73) Assignee: Fleavac, LLC, Carlsbad, CA (US)

( * ) Notice: Subject to any disclaimer, the term of this patent is extended or adjusted under 35 U.S.C. 154(b) by 517 days.

(21) Appl. No.: 12/704,462

(22) Filed: Feb. 11, 2010

(65) Prior Publication Data

US 2010/0205767 A1  Aug. 19, 2010

Related U.S. Application Data

(60) Provisional application No. 61/152,216, filed on Feb. 12, 2009, provisional application No. 61/228,906, filed on Jul. 27, 2009.

(51) Int. Cl.
*A01M 1/06* (2006.01)

(52) U.S. Cl.
USPC ............... 15/352; 15/339; 15/344; 15/394; 43/139

(58) Field of Classification Search
USPC ............. 15/394, 344, 339, 352; 43/139
See application file for complete search history.

(56) References Cited

U.S. PATENT DOCUMENTS

| | | | | |
|---|---|---|---|---|
| 2,629,681 A * | 2/1953 | Hill | ............... | 514/449 |
| 3,668,736 A * | 6/1972 | Loscalzo | ............... | 15/402 |
| 3,753,777 A * | 8/1973 | Thomsen et al. | ............... | 134/6 |
| 4,488,331 A | 12/1984 | Ward | | |
| 5,313,687 A * | 5/1994 | Schneider | ............... | 15/394 |
| 5,359,751 A * | 11/1994 | Bellardini | ............... | 15/394 |
| 5,367,821 A | 11/1994 | Ott | | |
| 5,488,754 A * | 2/1996 | Shadley | ............... | 15/394 |
| 2003/0097727 A1 * | 5/2003 | Keller | ............... | 15/345 |
| 2003/0131439 A1 * | 7/2003 | Wen | ............... | 15/344 |
| 2005/0198770 A1 | 9/2005 | Jung et al. | | |
| 2008/0066252 A1 * | 3/2008 | Herron | ............... | 15/246.2 |
| 2008/0190376 A1 | 8/2008 | Matsumoto | | |
| 2010/0154367 A1 * | 6/2010 | Luo et al. | ............... | 55/337 |
| 2010/0170060 A1 * | 7/2010 | Eccardt et al. | ............... | 15/415.1 |
| 2010/0293741 A1 * | 11/2010 | Ferris | ............... | 15/339 |

* cited by examiner

*Primary Examiner* — William Gilbert
*Assistant Examiner* — Alp Akbasli
(74) *Attorney, Agent, or Firm* — Mintz, Levin, Cohn, Ferris, Glovsky & Popeo, P.C.

(57) ABSTRACT

The subject matter disclosed herein provides a flea vacuum. The device may include a nozzle having a first opening and a second opening. The first opening may have a tapered end and may be configured to vacuum an insect (e.g., a flea, etc). The device may also include a hose coupled to the nozzle. The device may also include an adapter coupled to the hose. The adapter may have an end configured for insertion into a vacuum. The device may also include a kill agent comprising bentonite as the active ingredient for killing and/or neutralizing pests, such as for example fleas. Related apparatus and methods are also described.

17 Claims, 9 Drawing Sheets

FLEA VACUUM INCLUDING A KILL AGENT

CROSS REFERENCE TO RELATED APPLICATION

This application claims the benefit under 35 U.S.C. §119 (e) of the following provisional applications, which are incorporated herein by reference in their entirety: U.S. Ser. No. 61/152,216, entitled "FLEA VACUUM," filed Feb. 12, 2009 and 61/228,906, entitled "FLEA VACUUM INCLUDING A KILL AGENT," filed Jul. 27, 2009.

FIELD

The present disclosure generally relates to a flea vacuum attachment including a kill agent.

BACKGROUND

The flea is an insect that plagues the family pet. To rid a pet of fleas, a pet owner may treat the family pet with an insecticide. However, the use of insecticides may be toxic to the pet owner and/or the pet.

SUMMARY

In some aspects, the subject matter provides a system comprising a nozzle having a first opening and a second opening, the first opening having a tapered end, the first opening configured to vacuum an insect. The system may also include a hose coupled to the nozzle. The system may also include an adapter coupled to the hose, the adapter having an end configured for insertion into a vacuum. The system may also include a kill agent included in the vacuum, the kill agent comprising bentonite to at least one of kill or neutralize the insect.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
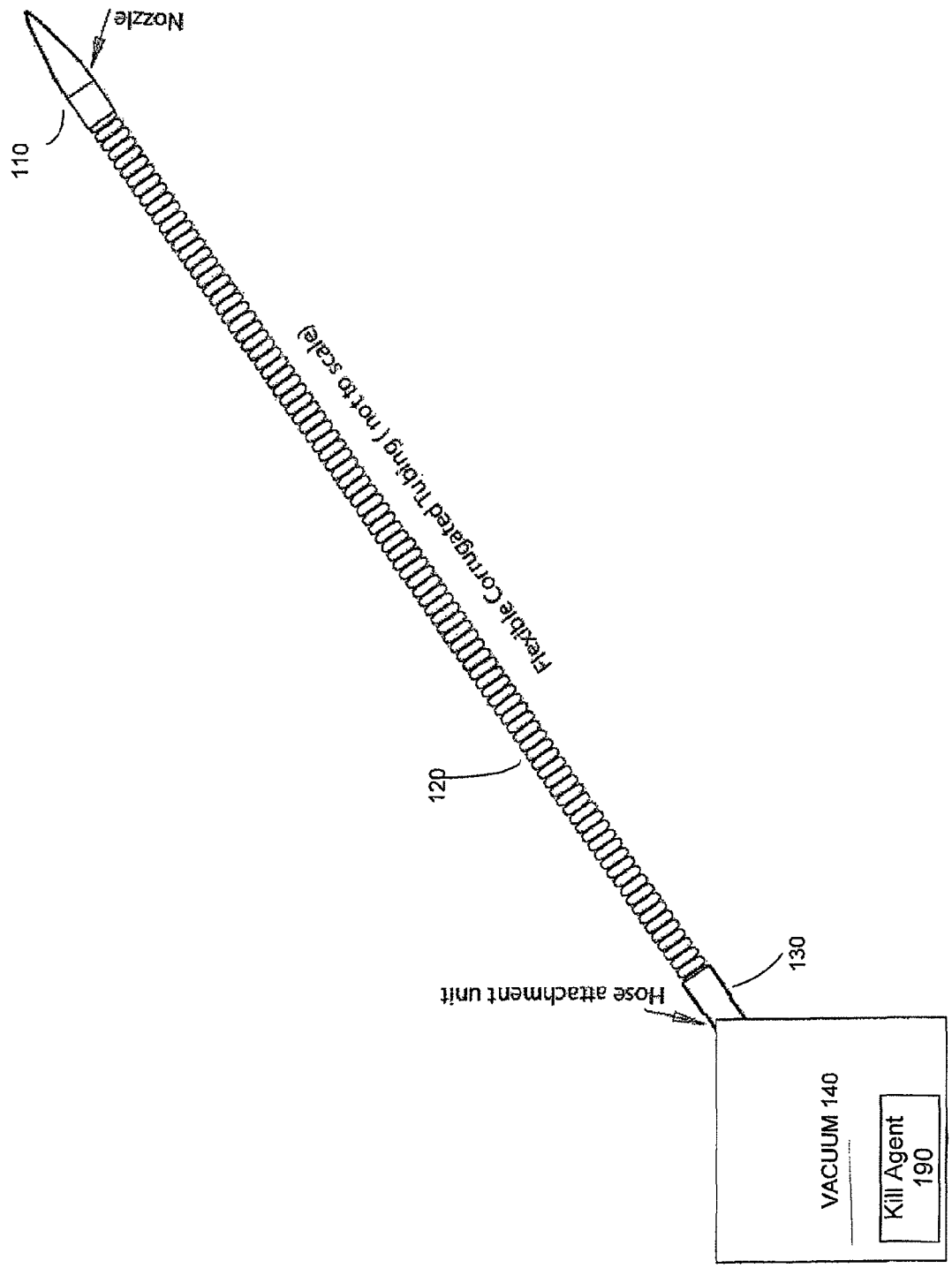
FIG. 1 depicts a flea vacuum 100.

Like labels are used to refer to same or similar items in the drawings.

DETAILED DESCRIPTION

The subject matter described herein relates to an attachment for a vacuum, the attachment includes a nozzle sized and shaped to collect fleas using suction. Moreover, the nozzle is shaped with a smooth edge, without a comb or teeth, to avoid jamming and clogging due to animal fur. The subject matter described herein also relates to a kill agent. In some implementations, the kill agent may be formulated using an inert carrier, such as for example bentonite, which has been found to kill pests, such as for example fleas. The kill agent may be formulated into pellets and placed into a vacuum to neutralize or kill fleas.

FIG. 1 depicts a flea vacuum 100. The flea vacuum 100 includes a nozzle 110 coupled to a hose 120. The hose 120 may include an adapter 130 (also referred to as a hose attachment) for attachment to a vacuum 140. The vacuum 140 may contain a kill agent 190 to kill and/or neutralize pests, such as for example fleas.

Figure 2:
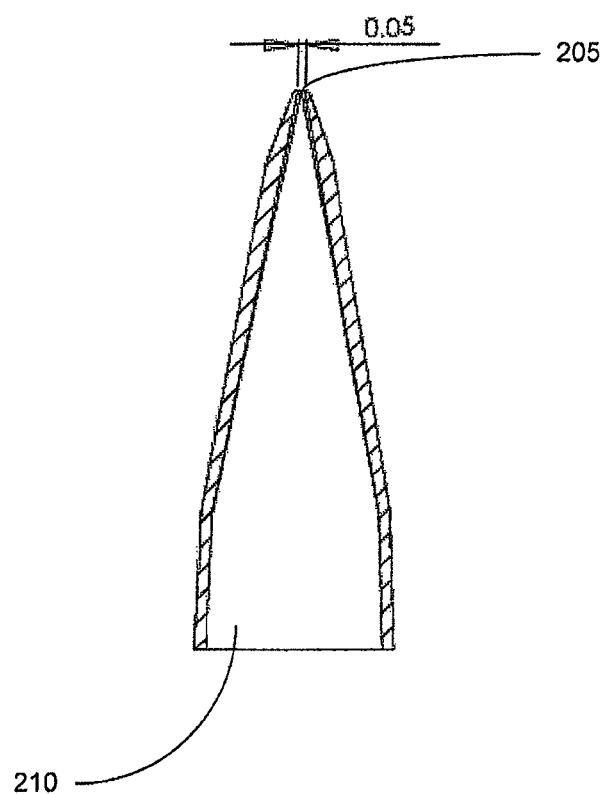
FIG. 2 depicts a nozzle 110 configured for the flea vacuum 100.

The nozzle 110 may be implemented using a rigid material, such as for example plastic, aluminum, and the like with an opening at each end of the hose 120. FIG. 2 depicts an example implementation of the nozzle 110. The nozzle 110 includes a first opening 205 configured to suck fleas from the fur (or skin) of an animal and a second opening 210 for coupling into the hose 120. The first and second openings 205 and 210 are configured to provide sufficient suction to suck fleas from the fur of an animal, such as for example a family pet, a dog, a cat, and the like.

In some implementations, the first opening 205 of nozzle 110 is substantially rectangular with a length of about 1 inch and a width of about 0.05 inches. Thus, the first opening has a cross sectional area of about 0.05 square inches. The second opening 210 is substantially cylindrical and has a diameter of about 1.25 inches as depicted at FIG. 2, although other dimensions may be used as well. The cross sectional area of the second opening 210 is about 1.23 square inches. Moreover, interior cavity of nozzle 110 comes to first opening 205 at an angle of about 45 degrees. The exterior surface of the first opening 205 is substantially smooth, tapered, and does not include a comb. The tapered opening allows the nozzle to travel close to the skin of the animal without being obstructed by fur or hair. Moreover, the ratio of 0.05 square inches to 1.23 square inches may provide enhanced suction to effectively collect fleas from the fur of an animal without becoming clogged with animal fur. And, the first opening which comes into contact with the animal having fleas may be sized in some implementation to about 0.05 inches and about 0.125 inches, which is effective for collecting fleas.

Figure 3:
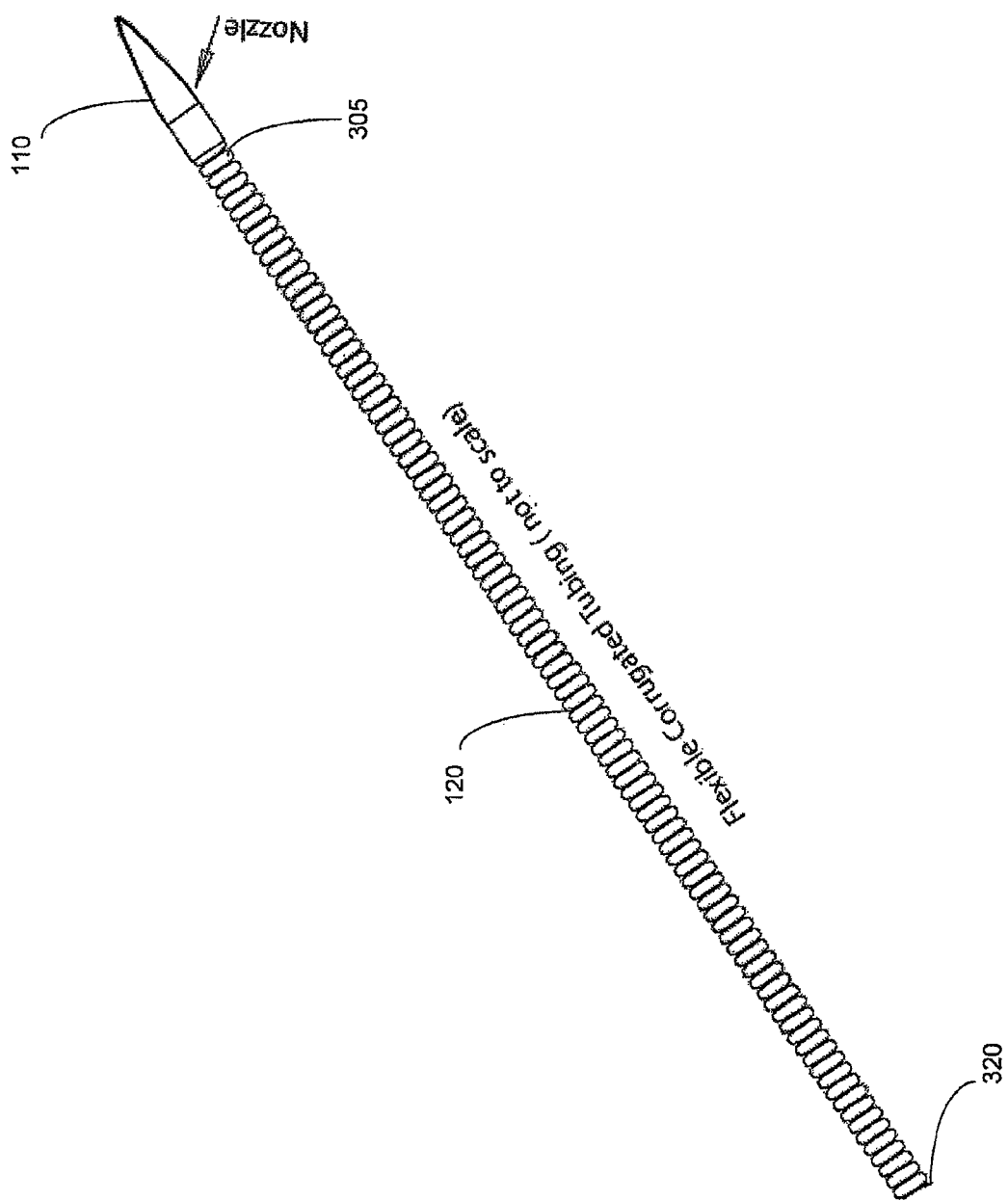
FIG. 3 depicts a hose 120 and a nozzle 110.

The hose 120 may have two openings at distal ends of the hose 120, and have a substantially cylindrical shape. The hose 120 may be implemented using a flexible, yet rigid material, such as for example plastic, or other materials typically used in connection with vacuums and their hoses. FIG. 3 depicts an example implementation of hose 120. One of the openings 305 may be inserted into the opening 210 of the nozzle 110 to fixedly attach (e.g., using adhesive, bonding, etc.) the nozzle 110 to hose 120. The other opening 320 of hose 120 is coupled to the adapter 130. Although FIG. 3 depicts hose 120 as corrugated, other types of hosing may be used as well.

Figure 4:
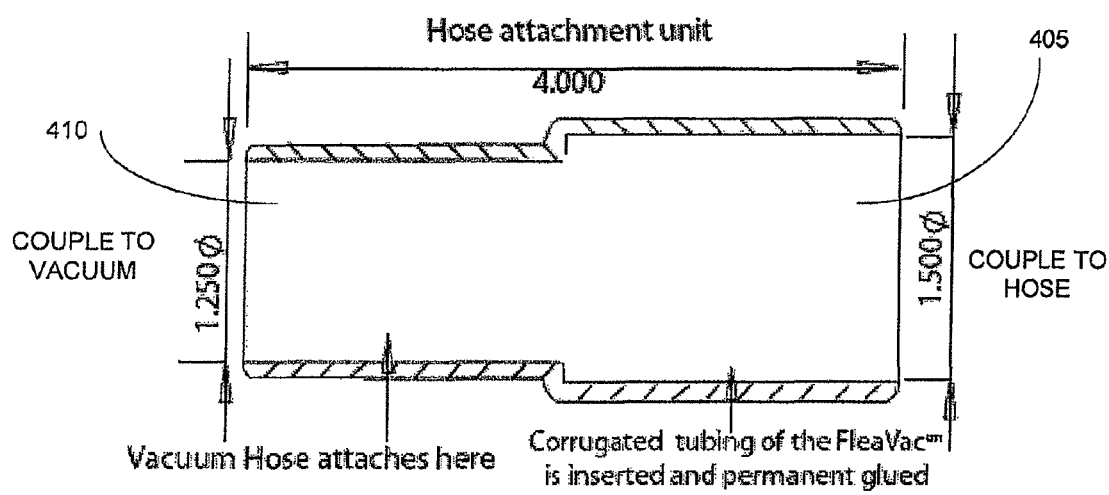
FIG. 4 depicts an example of an adapter 130.

The adapter 130 may have two openings 405 and 410 at distal ends, as depicted at FIG. 4. The first opening 405 is configured to receive the end 320 of the hose 120. The second opening 410 is configured to be inserted into vacuum 140 (e.g., a receptacle configured to receive 410 of adapter 130). In some implementations, the second opening 410 may be sized to a diameter of 1.250 inches to allow insertion into many (if not all) types of vacuums configured to receive so-called "standard" attachments with diameters of 1.250 inches. Moreover, the hose 120 may be inserted into the opening 405 of adapter 130 (e.g., the distal end of the hose 120 not connected to nozzle 110 may be inserted and fixedly attached to opening 405 of adapter 130).

The vacuum 140 may be implemented as any type of vacuum. In most implementations, the nozzle 110, hose 120, and adapter 130 are configured to be used with a variety of vacuums. In these cases, the adapter 130 is configured to allow coupling into the vacuum used to vacuum fleas. In other implementations, the nozzle 110, hose 120, and adapter 130 are specifically configured and fixedly attached to a vacuum configured especially for vacuuming fleas. Vacuum 140 may be implemented as a typical household vacuum that can be powered with about 7 amps to 18 amps to provide sufficient power for vacuuming fleas.

Figure 5:
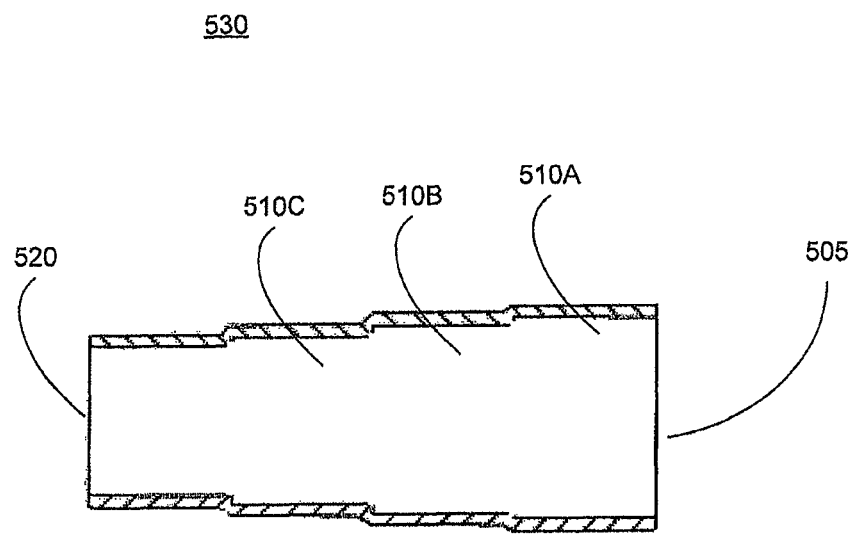
FIG. 5 depicts another example implementation of an adapter 530.

FIG. 5 depicts another implementation of an adapter 530. The adapter 530 includes three sections 510A, 510B, and 510C. Each section has a diameter of a different size to accommodate insertion of hoses having different diameters. For example, section 510A may have a diameter of 1.5 inches, section 510B may have a diameter of 1.250 inches, and section 510C may have a diameter of 1 inch. In some implementations, the adapter 530 is used instead of adapter 130 (e.g., opening 505 receives a hose and opening 520 is coupled to a vacuum). In other implementations, the adapter 530 is used in conjunction with adapter 530. For example, adaptor 130 is fixedly attached to hose 120, and the end 410 of adapter 130 is inserted into opening 505 of adapter 530. In this configuration, the end 520 of adapter 530 is inserted into a vacuum. In any case, the sections of adapter 530 accommodates hoses (and/or other adapters and vacuum attachments) having different diameters.

Figure 6:
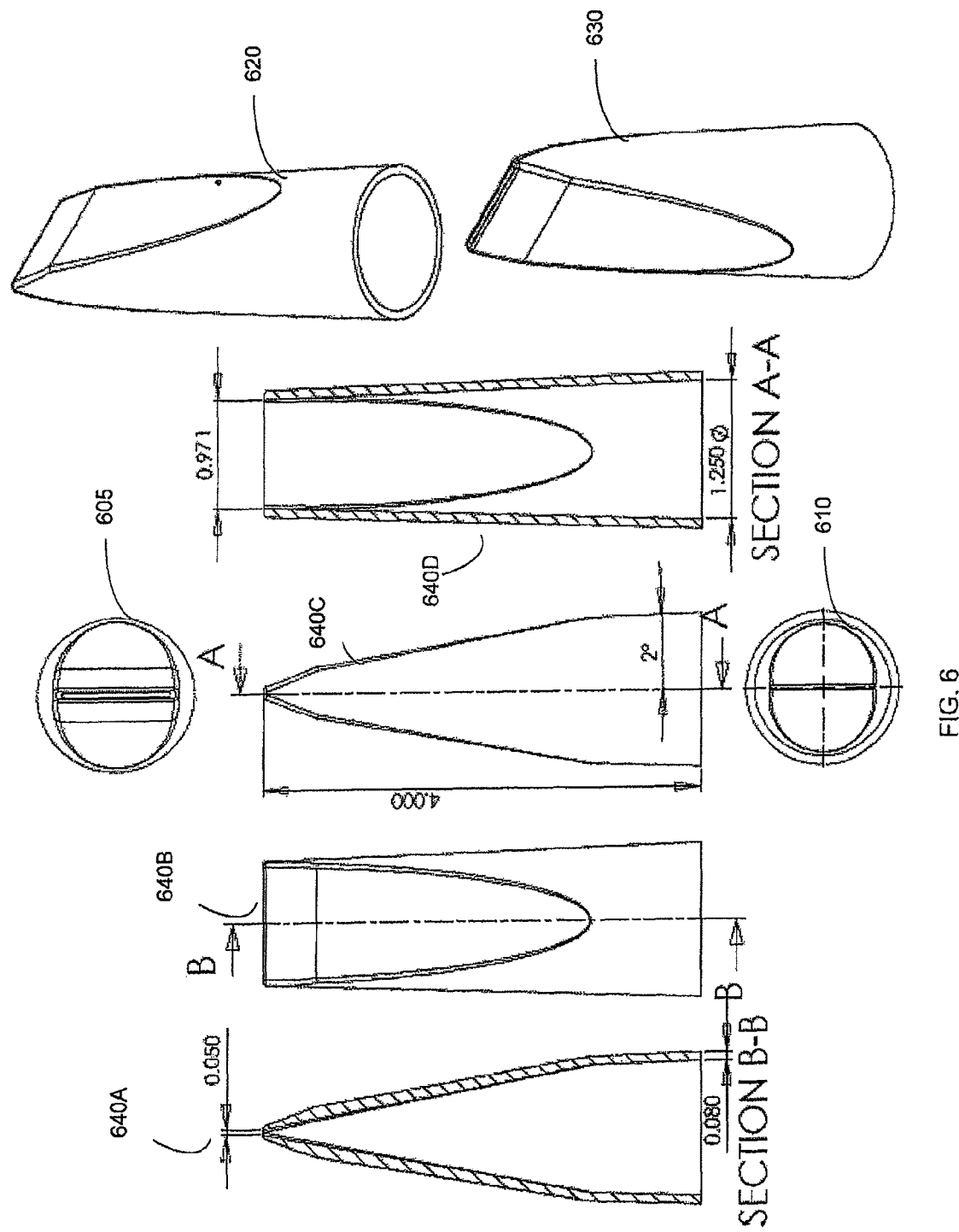
FIG. 6 depicts different views of an implementation of nozzle 110.

FIG. 6 depicts different views of nozzle 110. View 640A-D depicts side views of nozzle 110. View 605 depicts a top view of opening 205 of nozzle 110. View 610 depicts a bottom view of opening 210 of nozzle 110. Views 620 and 630 depict perspective views of nozzle 110. Although FIG. 6 depicts specific views of nozzle 110, other implementations may be used as well.

Figure 7:
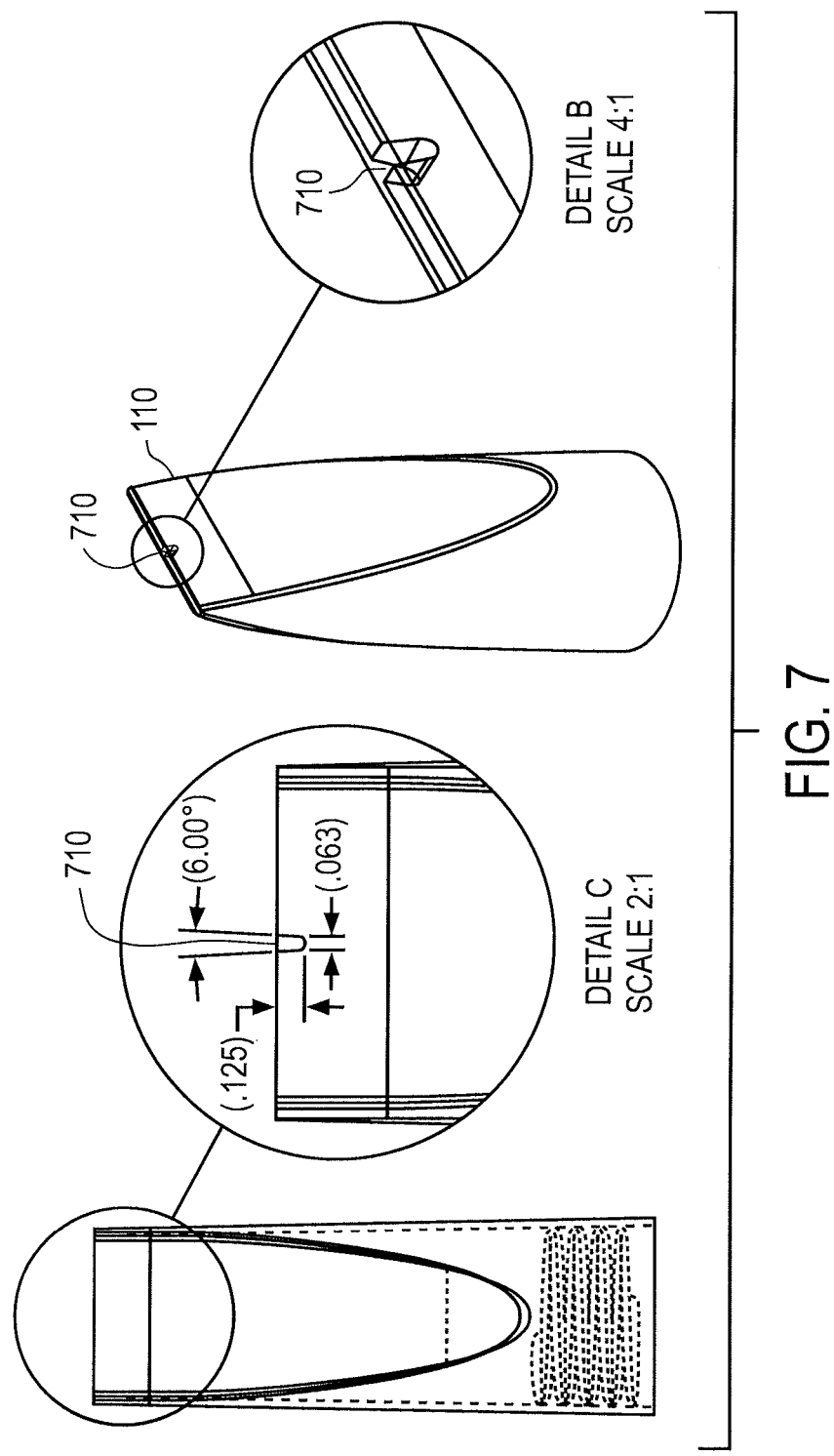
FIG. 7 depicts another implementation of nozzle 110.

FIG. 7 depicts another example of nozzle 110 having a first opening that is substantially rectangular. The width of the first opening is 0.125 inches and the length is about 1 inch. The first opening includes a notch at the midpoint of the first opening.

Figure 8:
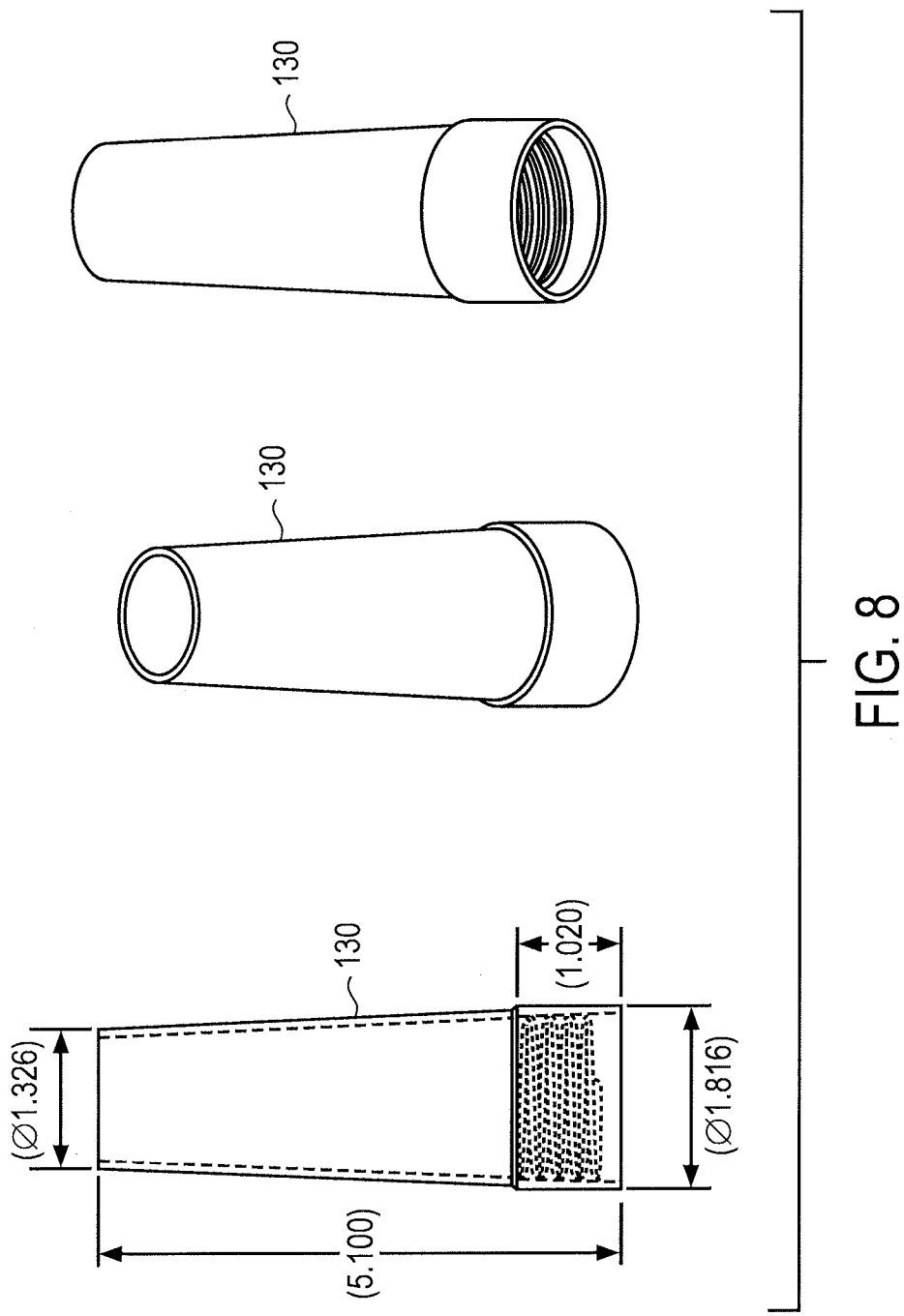
FIG. 8 depicts another implementation of adapter 130.
Figure 9:
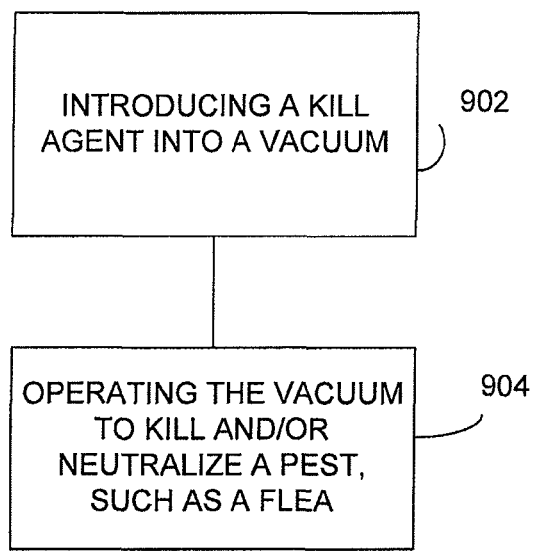
FIG. 9 depicts a process for using a kill agent comprising bentonite to kill and/or neutralize fleas.

FIG. 8 depicts another example implementation of adaptor 130. having a length of 5 inches, a first opening of 1.326 inches, and a second opening of 1.816 inches.

In some implementations, instead of using toxic flea medication to eliminate or reduce an infestation of fleas and/or other parasitic or otherwise unwanted pests or the like, the flea vacuum 100 may be used to remove such pests from an animal, such as a family pet (e.g., a dog, cat, etc.); from carpeting, furniture, or other household surfaces; from a human body; or the like. The nozzle 110, hose 120, and adapter 130 can be attached to a user's current vacuum to remove fleas, flea fecal matter, flea eggs, and flea larva from the animal by sucking the fleas, flea fecal matter, flea eggs, and flea larva through opening 205 of nozzle 110 and through hose 120 and adapter 130 and into vacuum 140.

Moreover, in some implementations, vacuum 140 is configured with a substance to neutralize and/or kill the fleas. For example, the fleas, flea fecal matter, flea eggs, and flea larva may be sucked into a bag or a container at vacuum 140. The bag or container at vacuum 140 may be preconfigured with a substance (e.g., a kill agent) for killing or neutralizing the fleas, flea fecal matter, flea eggs, and flea larva in the bag or container. For example, the substance may be implemented in pellet form. Alternatively, the kill pellets may be sucked into the vacuum 140. The kill pellets in the vacuum 140 (e.g., in a vacuum cleaner bag, a waste container in the vacuum, a dirt receptacle, etc.) kill or neutralize pests, such as for example fleas, flea fecal matter, flea eggs, and flea larva, that are sucked into the bag or container. In any case, a user does not have to come into direct contact with the kill agent or fleas because contact between one or more pests occurs within the vacuum instead of on the pet, on one or more household surfaces with which humans and pets come into contact, or the like. Moreover, by using a kill agent in the dirt collection chamber (or bag), pests (e.g., fleas, pests, and the like) are sucked into the dirt collection chamber and then killed prior to disposal, reducing the likelihood that the pests will reproduce and/or re-infest the pet, home, or immediate environment. The pellets may be nontoxic to the pet being vacuumed for fleas. In some implementation, about two ounces of the kill agent are used in a two litter collection chamber to effectively kill and/or neutralize pests, such as fleas.

In some implementations, the kill agent used to neutralize and/or kill pests, e.g., fleas, can include particles of bentonite. Bentonite is an absorbent aluminium phyllosilicate clay-like material whose chemical structure includes tetrahedral sheets of corner sharing $SiO_4$ and $AlO_4$ tetrahedra having a chemical composition of $(Al,Si)_3O_4$ bonded to octahedral sheets formed from small cations, such as sodium, potassium, calcium, and aluminum, coordinated to six oyxgen atoms. Although bentonite is typically used as an inert carrier, bentonite alone or, alternatively in combination with another inert substance, such as for example a scented oil, may kill and/or neutralize pests, such as for example fleas. Testing of bentonite shows that the bentonite is by itself effective in killing and/or neutralizing pests, such as for example fleas. The bentonite kills/neutralizes the pests, fleas, and the like using abrasion, suffocation, and other mechanisms. Table 1 below depicts test results of bentonite. Referring to Table 1, bentonite (labeled α—Clay) kills (or neutralizes) 40% of fleas after 15 minutes of contact with the bentonite, kills 84% of the fleas after 1 hour of contact with the bentonite, and so forth as depicted in Table 1.

TABLE 1

Percent reduction of cat fleas, Ctenocephalides felis, using several different natural products in different litter substrates after being vacuumed through a closed system.

| Product-Litter | % Reduction | | | | |
| --- | --- | --- | --- | --- | --- |
| | 15 Min | 1 hr | 2 hr | 3 hr | 20 hr |
| α-Clay | 40.0% | 84.0% | 96.0% | 100.0% | 100.0% |
| α-Wheat | 24.0% | 12.0% | 8.0% | 24.0% | 84.0% |
| Yard & Kennel-Clay | 40.0% | 60.0% | 80.0% | 84.0% | 100.0% |
| Yard & Kennel-Wheat | 40.0% | 48.0% | 76.0% | 84.0% | 100.0% |
| Bug Defence-Clay | 44.0% | 56.0% | 96.0% | 100.0% | 100.0% |
| Bug Defence-Wheat | 44.0% | 24.0% | 36.0% | 44.0% | 72.0% |
| Cinnacure-Clay | 64.0% | 44.0% | 36.0% | 36.0% | 72.0% |
| Cedarcide-Clay | 56.0% | 52.0% | 64.0% | 68.0% | 84.0% |
| Lemongrass/Spearmint-Clay | 44.0% | 24.0% | 32.0% | 8.0% | 76.0% |
| H₂O Control α-Clay | 28.0% | 20.0% | 20.0% | 20.0% | 28.0% |

The bentonite may have a particle size of between about 10 micron to about 100 microns, although the bentonite may have other sizes as well.

In some implementations, the bentonite particles may be combined with one or more other agents that are non-toxic and/or natural. For example, the bentonite particles may include Geraniol, mint oil, cedar oil, and/or sodium lauryl sulfate. In these formulations, the bentonite is effective in killing pests, such as for example fleas. In some implementations, the kill agent is formulated using about 92.6% bentonite, about 5% water, 0.8% geraniol, 0.8% mint oil, 0.3% cedar oil, and 0.5% sodium lauryl sulfate.

In some implementations, the kill agent can include flea control pellets formed of aggregated bentonite particles and/or one or more other chemical components or additives, such as for example those discussed in the preceding paragraph, an insecticide or pesticide as discussed below, or the like. The one or more other chemical components or additives. When this is the case, the flea control pellets may be deposited into the replaceable vacuum bag of vacuum 140 (e.g., directly placed into the bag by a user/manufacturer or sucked into the bag by the vacuum). To remove fleas, a user may run his or her hands against the grain of the pet's fur and slide the tip (e.g., first opening 205) of the nozzle 110 along the exposed skin of the pet to vacuum any fleas, flea fecal matter, flea eggs, and flea larva. The nozzle 110 may also be used on the pet's belly and haunches and other locations frequented by fleas. Once sucked through the nozzle 110, hose 120, adapter 130, and vacuum 140, the fleas are then deposited into the replaceable vacuum bag of the vacuum 140, which in some implementations includes a kill agent to kill or neutralize any fleas, eggs, larvae, and the like. The flea vacuum 100 may also be used to vacuum other areas in the home, such as for example any bedding used by pets, carpeting, upholstery, and the like, to gather fleas, eggs larva and feces that have fallen off the pet. The flea vacuum 100 may be used repeatedly to gather any fleas, eggs, fecal matter, or larvae without harm since the flea vacuum and kill agent are nontoxic.

As noted above, the flea vacuum may be used with a kill agent. The following describes example implementations including the kill agent. Generally, the kill agent is placed inside the dirt receptacle or dirt collection chamber of the flea vacuum (or any other vacuum) to kill insects, pests, parasites, and the like that are vacuumed into the receptacle or chamber of the vacuum. The kill agent may be used in combination with the flea vacuum system, although the kill agent described herein may also be used as a stand-alone product to kill pests that are vacuumed in the receptacle or chamber of a standard household or commercial vacuum.

The kill agent may be implemented as an inert, all natural product, such as for example bentonite and the like, although in some cases an insecticide may be used as well. When an insecticide is used, the kill agent comprises an insecticide in combination with an inert carrier substance, such as for example bentonite and the like.

Although bentonite is used as an inert carrier (with kill properties of its own), the inert carrier may be implemented in a variety of forms.

The inert carrier may be composed of material that is non-toxic to humans (as well as the animal, such as the pet, infested with fleas) and is environmentally benign. For example, the inert carrier may include one or more of the following: organic material such as corn, gelatinized corn, ground corn, corn cob, other derivatives of corn from thermo mechanical processing, citrus derivatives, citrus peel, ground citrus peel, wood, wood chips, sawdust, clay particles, citrus pulp, grains such as wheat, barley, quinoa, rice, oat, fruit and vegetable pulps, nut shells, bean shells, synthetic materials, inorganic materials and the like. Examples of synthetic materials include absorbent and high-absorbent materials such as carboxymethyl cellulose and hydroxyethyl methacrylate. Examples of inorganic media include silica, alumina, titania, sodium sulfate, sodium bicarbonate, calcium sulfate, zinc silicate, zinc aluminate, large size (granular) diatomaceous earth, kaolin, calcium carbonate, and the like.

Generally, the inert carrier is a macroscopic particle, on the order of about 100 to about 10,000 microns in diameter, although other sized particles may be used depending on the type of vacuum being used. If the particle size is too small, it may escape the pores in the vacuum cleaner bag. The particle may consist of one discreet particle, or be composed of smaller particles held together physically in aggregate or agglomerate form. The particles may be in pellet form or some other form such as for example a tablet or crushed pellet. Pelletization, tablet pressing, roll compaction, extrusion, and other methods may be used to create the particle. For example, the inert carrier has a form and size so that the particles of the kill agent are contained within the vacuum dirt collection chamber (or bag). For example, dust media, such as diatomaceous earth, may not be a suitable carrier for the flea vacuum implementation described above as their small particle size may allow escape from the vacuum cleaner bag.

In implementations of the kill agent using an insecticide or pesticide, the insecticide and/or pesticide may include a variety of substances. For example, the insecticide/pesticide may be chosen from a group of substances derived from plant essential oils, which possess little or no known toxicity to humans. In some implementations, the insecticide comprises a combination of substances derived from plant essential oils. Such plant essential oils may penetrate the exoskeleton of the insect, and/or act as inhibitors of octopamine. The insecticide may also be chosen from the group of synthetic insecticides. The insecticide may be a combination of synthetic insecticides and those derived from plants. The insecticide may also be chosen based on its toxicity to fleas, but the insecticide may be formulated to target pests or than fleas, such as for example mites, ticks, bed bugs, and the like. Moreover, The insecticide may comprise one or more of the following: α-terpineol, amyl cinnamic aldehyde, amyl salicylate, anethole, anisic aldehyde, benzyl alcohol, benzyl acetate, carvacrol, carveol, castor oil, cinnamaldehyde, cinnamic alcohol, cinnamon leaf oil, citral, citronellal, citronellol, clove oil, cornmint oil, p-cymene, diethyl phthalate, dimethyl salicylate, dipropylene glycol, eucalyptol, eugenol, iso-eugenol, galaxolide, geraniol, guaiacol, ionone, lemongrass oil, menthol, menthyl salicylate, methyl anthranilate, methyl ionone, methyl salicylate, peppermint oil, α-phellandrene, pennyroyal oil, perillaldehyde, 1- or 2-phenyl ethyl alcohol, 1- or 2-phenyl ethyl propionate, piperonal, piperonyl acetate, piperonyl alcohol, pulegone, rosemary oil, sesame oil, strawberry glycidate, α-terpineol, terpinen-4-ol, terpinyl acetate, other terpineols and derivatives of α-pinenes, 4-tert butylcyclohexyl acetate, thyme oil, thymol, metabolites of trans-anethole, vanillin, ethyl vanillin, wintergreen oil, and the like. Derivatives, racemic mixtures, diastereomers, enantiomers, hydrates, salt forms and the like of such insecticides may also be included. The plant essential oils may also include compounds such as for example pyrethrins I and II, neem oil, d-limonene, and citronella oil. Other oils which do not possess insecticidal activity in themselves, such as for example canola oil, may be present in the insecticide as well.

Synthetic ingredients may also be present with the plant essential oils to form an insecticide for use with the kill agent. The synthetic ingredient may include any pesticide used to combat pests including one or more of the following: dimethyl sulfoxide, pyrethroids (e.g. cypermethrin, imiprothrin, λ-cyhalothrin, permethrin, chlorpyrifos, phenothrin, diazinon, etofenprox, and various pyrethrin derivatives including cinevin I, cinevin II, jasmolin I, and jasmolin II), N-phenylpyrazole derivatives (e.g. fipronil), organophosphates and organocarbamates (e.g. dichlorvos, cythioate, diazinon, malathion, carbaryl, fenthione, methylcarbamate, and prolate), imidacloprid, arylheterocycles, insect growth regulators (e.g. agridyne, diofenolan, fenoxycarb, hydroprene, kinoprene, methoprene, pyriproxyfen, tetrahydroazadirachtin, chlorfluazuron, cyromazine, diflubenzuron, fluazuron, flucycloxuron, flufenoxuron, hexaflumuron, ifenuron, tebufenozide, and triflumuron), amitraz, selamectin, nitenpyram, and the like, as well as combinations thereof.

If the inert carrier is composed generally of processed organic material, the inert carrier may be made by one of several methods. For example, pelletization may be performed with the insecticide present during the pelletization process, or before its introduction. If the pellet is pre-formed, the insecticidal oils may be introduced into the pellet by soaking at room temperature for periods up to 48 hours. Faster production times (e.g. on the order of several minutes) and higher oil loadings may be achieved by using methods designed for animal feed pellets, in which the mixing temperature is higher than room temperature but less than 70 C. This is followed by a period of reduced pressure in a vacuum chamber. The use of higher temperature and applied vacuum increases the achievable oil loading from approximately 15% to about 40-50% by weight. Specific temperatures and reaction times will be dependent on the particular insecticide used, the carrier composition, and the desired insecticide loading on the carrier. These methods are known to minimize the stickiness of the pellet while retaining its physical integrity.

If the carrier of the kill agent is composed of relatively unprocessed organic material, for example rice grains or corn, the loading of the insecticidal oils may be enhanced by cooking the grain to cause partial gelatinization of the starch present. The partial gelatinization allows the grain to swell slightly, and enhance the oil uptake. Too much gelatinization may harm the physical integrity of the grain. Such cooking can be accomplished industrially by passing the grain or milled grain through a twin screw cooking mixer.

If the carrier of the kill agent is composed of generally inorganic material, solid-state mixing, mixer-pelletizing, compressing equipment, blending and ribbon-blending, and the like may be used to create the pellet. In these cases, larger particle size (e.g. >100 microns) or granular material should be used; or, if smaller particles are used, binders are generally necessary in order to produce a larger aggregate or agglomerate. Suitable binders include sodium lignin sulfate and sodium resinate (rosin). If the pelletization is performed prior to the introduction of the insecticide, the pellets are produced, dried, and sieved to prepare appropriately sized particles (e.g. 100 microns-10,000 microns). If the insecticide is present during the pelletization process, the inorganic ingredients may be mixed with it (e.g. in a ribbon blender) directly. Methods are known in which chopper blades are used within ribbon blenders to produce inorganic carrier-oil composites with minimal particle sizes below 100 microns.

All of the above described carrier types may also be mixed with insecticidal oils with a liquid spray process, in which the oils are dissolved in a suitable solvent to create a spray solution or emulsion. The spray is applied to the particles during continuous mixing and then dried to eliminate or at least substantially remove the solvent.

In all cases of the above carrier types, other useful components may be present. Such components may aid the manufacturing, reduce cost, act as diluents, wetting agents, surfactants, fragrances, synergists (which enhance the effectiveness of the insecticide, e.g. piperonyl butoxide), binders, stabilizers, dedusting agents, deaggregators, and the like.

Once the insecticidal composition has been suitably combined with the carrier, the kill agent is stored in an airtight or hermetic chamber. Individual doses, which may be contained in a small tin, are used in their entirety during an animal vacuuming. The actual amount of agent used may vary, depending on such factors as the insecticide loading, the particle size of the carrier, the desired killing rate of the pest, the size of the animal, the shelf life of the agent, and other factors.

In some cases, insect repellants may not be suitable because they do not kill (or otherwise neutralize) insects, although an insect repellant, such as for example cedar chips, may be used as an inert carrier of the kill agent.

In addition to being a flea vacuuming system, the nozzle may be used to vacuum bed bugs, dust mites, lice and other pests along with their eggs and larva. In addition, the flea vacuuming system device may be used to vacuum carpets as well as other types of flooring, furniture, human and animal bedding, and even human skin and/or hair to remove pests from these places. The placement of a killing agent inside the vacuum may also be used to kill bed bugs, dust mites, lice and other pests in side a vacuums dirt receptacle. The attachment adapter 130 may also be cone shape instead of stair stepped to accommodate various diameters of vacuum attachment hoses as depicted at FIG. 8.

In an implementation, a method for eliminating or reducing fleas or other insect or similar pests can include the use of a kill agent in conjunction with either a specially tasked vacuum device or with a standard household or commercial vacuum cleaner. The method, as illustrated in the process flow chart 900 of FIG. 9, can include introducing the kill agent into a collection receptacle (for example a dust collection container or bin, a bag, or the like) of the vacuum device at 902. The kill agent can be introduced by manually inserting pellets of the kill agent into an opening of the collection receptacle prior to operation of the vacuum or alternatively by placing pellets of the kill agent on a substantially horizontal surface and operating the vacuum to entrain the pellets into the receptacle via suction action of the vacuum. At 904, the vacuum device is operated to entrain an insect pest into the collection receptacle such that the insect pest contacts the kill agent in the collection receptacle, thereby neutralizing the insect pest.

The subject matter described herein may, in some implementations, provide one or more of the following advantages. Unlike past approaches, the nozzle does not have teeth, bristles, combs and the like to impede the travel of the nozzle through the fur. Moreover, bentonite is an inert, clay-like carrier, and thus provides a safe, environmentally friendly agent for killing fleas in accordance with guidelines and statutes, such as the Federal Insecticide, Fungicide, and Rodenticide Act (FIFRA).

The foregoing description is intended to illustrate but not to limit the scope of the invention, which is defined by the scope of the appended claims. Other embodiments are within the scope of the following claims.

What is claimed:

1. A method comprising:

collecting and depositing an insect into a collection receptacle of a vacuum device;

concurrently containing the insect and a kill agent in the collection receptacle, the kill agent comprising bentonite; and neutralizing the insect by contact with the kill agent in the collection receptacle.

2. The method of claim 1, wherein the kill agent comprises a second kill agent comprising a chemical insecticidal agent.

3. The method of claim 1, wherein introducing the kill agent into the collection receptacle of the vacuum device comprises at least one of direct placement of the kill agent into the collection receptacle and sucking the kill agent into the collection receptacle with the vacuum device.

4. The method of claim 1, wherein the insect comprises at least one of a flea and a bed bug.

5. The method of claim 1, further comprising introducing the kill agent into the collection receptacle.

6. The method of claim 1, wherein the kill agent comprises particles having a size of between about 10 microns to about 100 microns.

7. The method of claim 1, wherein the kill agent consists essentially of bentonite.

8. The method of claim 1, wherein the kill agent consists of particles having a sufficient particle size to be contained within the collection receptacle, the sufficient particle size being larger than pores in the collection receptacle.

9. The method of claim 1, wherein the sufficient particle size ranges from about 100 to about 10,000 microns.

10. A device comprising:
a nozzle having a first opening and a second opening, the first opening having a tapered end, the first opening configured to vacuum an insect;
a hose coupled to the nozzle;
an adapter coupled to the hose, the adapter having an end configured for insertion into a vacuum;
a collection receptacle configured to collect the insect after the insect is deposited in the collection receptacle during operation of the vacuum; and
a kill agent included in the collection receptacle of the vacuum, the kill agent comprising bentonite to and neutralize the insect when the insect contacts the bentonite.

11. The device of claim 10, wherein a ratio of a second cross-sectional area of the second opening of the nozzle to a first cross sectional area of the first opening of the nozzle is between a range of about 10 and 25, wherein the second opening of the nozzle couples to the hose, and the first opening of the nozzle comes into contact with an animal where the insect is located.

12. The device of claim 10, wherein the first opening of the nozzle is substantially rectangular with an opening of between about 0.05 inches and 0.125 inches, wherein the first opening of the nozzle comes into contact with an animal where the insect is located.

13. The device of claim 10, wherein the first opening of the nozzle does not include a comb.

14. The device of claim 10,
wherein a second kill agent is included in the collection receptacle, the second kill agent comprising an insecticidal agent.

15. The device of claim 10, wherein the neutralizing of the insect comprises killing the insect when the insect contacts the bentonite.

16. The device of claim 15, wherein the kill agent consists essentially of bentonite and the insect comprises at least one of a flea and a bed bug.

17. The device of claim 1, wherein the kill agent comprising particles having a sufficient particle size to be contained within the collection receptacle, the sufficient particle size ranging from about 100 to about 10,000 microns and being larger than pores in the collection receptacle.

* * * * *